US012292022B2

(12) United States Patent
Coldren et al.

(10) Patent No.: US 12,292,022 B2
(45) Date of Patent: May 6, 2025

(54) CONTAINERIZED ALTERNATIVE FUEL CONTROL UNIT

(71) Applicant: Caterpillar Inc., Peoria, IL (US)

(72) Inventors: Dana Ray Coldren, Secor, IL (US); Bryan E. Nelson, Chillicothe, IL (US); Hoisan Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 143 days.

(21) Appl. No.: 18/118,982

(22) Filed: Mar. 8, 2023

(65) Prior Publication Data

US 2024/0301849 A1 Sep. 12, 2024

(51) Int. Cl.

*F02M 37/00* (2006.01)
*B63H 21/14* (2006.01)
*B63H 21/38* (2006.01)
*F02M 37/04* (2006.01)
*F02M 37/32* (2019.01)

(52) U.S. Cl.

CPC ......... *F02M 37/0017* (2013.01); *B63H 21/14* (2013.01); *B63H 21/38* (2013.01); *F02M 37/0023* (2013.01); *F02M 37/0052* (2013.01); *F02M 37/0088* (2013.01); *F02M 37/04* (2013.01); *F02M 37/32* (2019.01)

(58) Field of Classification Search

CPC ........... F02M 37/0017; F02M 37/0023; F02M 37/0052; F02M 37/0088; F02M 37/04; F02M 37/32; B63H 21/14; B63H 21/38

See application file for complete search history.

(56) References Cited

U.S. PATENT DOCUMENTS 5,139,000 A * 8/1992 Sawert .................. F02M 37/18 123/514
5,368,001 A * 11/1994 Roche ................ F02M 37/0088 137/587
6,035,830 A * 3/2000 Saito .................... F02M 37/007 123/457
6,390,871 B1 * 5/2002 Wickman ............... B63H 21/38 123/41.31

(Continued)

FOREIGN PATENT DOCUMENTS

GB 2521275 A * 6/2015 ........... F02D 33/003
KR 20160064874 6/2016
KR 102246254 4/2021

*Primary Examiner* — John M Zaleskas

(74) *Attorney, Agent, or Firm* — Schwegman Lundberg & Woessner, P.A.

(57) ABSTRACT

An alternative fuel management system may include a base configured for arrangement on a supporting floor or other framework of a vessel and configured to support alternative fuel supply equipment. The system may also include a sealed enclosure sealingly coupled to the base and configured to surround the alternative fuel supply equipment. The system may also include the alternative fuel supply equipment and it may be arranged within the sealed enclosure. The alternative fuel supply equipment may include a high-pressure pump, a fuel filter, a transfer pump, and a high-pressure fuel delivery line extending across the sealed enclosure and configured to provide alternative fuel from the high-pressure pump to a combustion engine. The alternative fuel management system may also include a purge fluid system configured to deliver purge fluid to the combustion engine from a source of purge fluid.

19 Claims, 7 Drawing Sheets

(56) References Cited

U.S. PATENT DOCUMENTS 6,527,603 B1 * 3/2003 Wickman ............... B63H 21/38
440/88 F
6,694,955 B1 * 2/2004 Griffiths ............... F02M 25/089
123/509
6,718,953 B1 * 4/2004 Torgerud ............. F02M 37/103
123/519
6,899,580 B1 * 5/2005 Kollmann .............. F02M 31/20
440/88 F
7,112,110 B1 * 9/2006 Kollmann .......... F02M 37/0088
440/88 F
7,178,512 B1 * 2/2007 Merten .................. F02M 37/10
137/565.17
9,200,600 B1 * 12/2015 Taylor .................. F02M 25/089
10,703,447 B2 7/2020 Kulaga et al.
10,731,550 B2 8/2020 Kuhlmann
2003/0029390 A1 * 2/2003 Campion ................ F02B 63/04
123/2
2004/0250871 A1 * 12/2004 Bingham .................. F17C 7/02
141/59
2006/0075987 A1 * 4/2006 Digregorio ............ B63H 21/14
123/198 E
2010/0060016 A1 * 3/2010 Hunter ...................... F03G 7/08
290/55
2010/0060093 A1 * 3/2010 Hunter .................... B60L 53/53
290/55
2011/0048386 A1 * 3/2011 Achor ................ F02M 25/0872
123/519
2011/0168138 A1 * 7/2011 Achor .................... F02M 37/08
123/516
2011/0302923 A1 * 12/2011 Hartono ................... B63J 99/00
431/12
2012/0102929 A1 * 5/2012 Beissler ................ F01N 13/002
60/297
2012/0180765 A1 * 7/2012 Saler .................. F02M 37/0052
261/62
2012/0186562 A1 * 7/2012 Achor .................... F02M 37/20
123/516
2013/0078878 A1 * 3/2013 Sayer ..................... F02M 37/08
440/88 F
2013/0233388 A1 * 9/2013 Utal ...................... F17C 13/123
137/1
2014/0182552 A1 * 7/2014 Brown .................... F02D 19/10
123/456
2014/0299101 A1 * 10/2014 Melanson ............ F02M 21/029
123/445
2016/0160752 A1 * 6/2016 Kuhlmann ................. B63J 3/04
290/1 A
2018/0106249 A1 * 4/2018 Lehman .................. F04B 23/04
2020/0039613 A1 * 2/2020 Kulaga ................... B63B 27/34
2020/0263567 A1 * 8/2020 Himschoot ........... F02B 63/044
2020/0277036 A1 * 9/2020 Radebold ........... F02M 21/0218
2024/0141857 A1 * 5/2024 Kim .................... F02D 19/0615

* cited by examiner

CONTAINERIZED ALTERNATIVE FUEL CONTROL UNIT

TECHNOLOGICAL FIELD

The present application relates generally to fuel supply systems for machines and, in particular, vessels such as floating vessels including floating work vessels, work boats, recreational floating vessels, and other machines and vessels. Still more particularly, the present application relates to control systems for alternative fuel systems on vessels. Even more particularly, the present application relates to isolating and/or containing particular aspects of alternative fuel systems on vessels.

BACKGROUND

Machines and vessels and, in particular, work machines and work vessels may be powered by a fuel source of a particular type. For example, many work machines or work vessels may be diesel-powered machines or vessels. Depending on the nature of the machine or vessel and the region or regions in which the machine or vessel operates, various regulations may apply to the operation of the machine and/or the emissions of the machine. In some cases, machines or vessels operating on waterways and, in particular, inland waterways may be subject to regulation by multiple regulating authorities and/or more stringent regulations. It is envisaged that regulating authorities may move to requiring and/or encouraging the use of alternative fuels to operate work machines or vessels. However, equipment and/or fleet owners may not be inclined to outfit the work machines or vessels in their fleet with provisions for alternative fuel due to cost, space constraints, and a variety of other factors.

U.S. Pat. No. 10,731,550 relates to a power supply unit, power assembly, and water vehicle having a power supply unit or having a power supply assembly. U.S. Pat. No. 10,703,447 relates to a bridged fuel tender for marine vessels. The fuel tender may include a first pontoon, a second pontoon, and a truss structure connecting them. The first pontoon may be separated from the second pontoon by a distance greater than a width of a marine vessel so the tender can straddle the marine vessel and a fuel reservoir may be connectable to a fuel inlet port for an internal combustion engine on the marine vessel. KR 2016-0064874 relates to a fuel supply system including multiple supply tanks which are supplied with liquefied fuel from a storage tank. A boil off gas (BOG) generated in the supply tank is supplied to the engine as the fuel gas.

SUMMARY

In one or more examples, an alternative fuel management system may include a base configured for arrangement on a supporting floor or other framework of a vessel and configured to support alternative fuel supply equipment. The system may also include a sealed enclosure sealingly coupled to the base and configured to surround the alternative fuel supply equipment. The system may also include the alternative fuel supply equipment arranged within the sealed enclosure. The alternative fuel supply equipment may include a high-pressure pump configured to be placed in fluid communication with a main alternative fuel tank arranged outside the sealed enclosure via a fuel supply line that extends across the sealed enclosure. The alternative fuel supply equipment may also include a fuel filter arranged along the fuel supply line and between the main alternative fuel tank and the high-pressure pump, a transfer pump configured to deliver alternative fuel to the high-pressure pump, and a high-pressure fuel delivery line extending across the sealed enclosure and configured to provide alternative fuel from the high-pressure pump to a combustion engine. The alternative fuel management system may also include a purge fluid system configured to deliver purge fluid to the combustion engine from a source of purge fluid.

In one or more other examples, a motive system for a vessel may include a combustion engine, a primary fuel source and an alternative fuel source. The primary fuel source may include a primary fuel supply tank, a primary fuel supply line extending from the primary fuel supply tank to the combustion engine, and a primary fuel filter arranged on the primary fuel supply line. The alternative fuel source may include an alternative fuel tank, a source of purge fluid and an alternative fuel management system as described immediately above.

In still other examples, a waterborne vessel may be provided and may include a hull, a floor arranged on the hull, and a propulsion system including a combustion engine system comprising a combustion engine and a primary source of fuel. The vessel may also include an alternative fuel management system as described immediately above.

DETAILED DESCRIPTION

Figure 1:
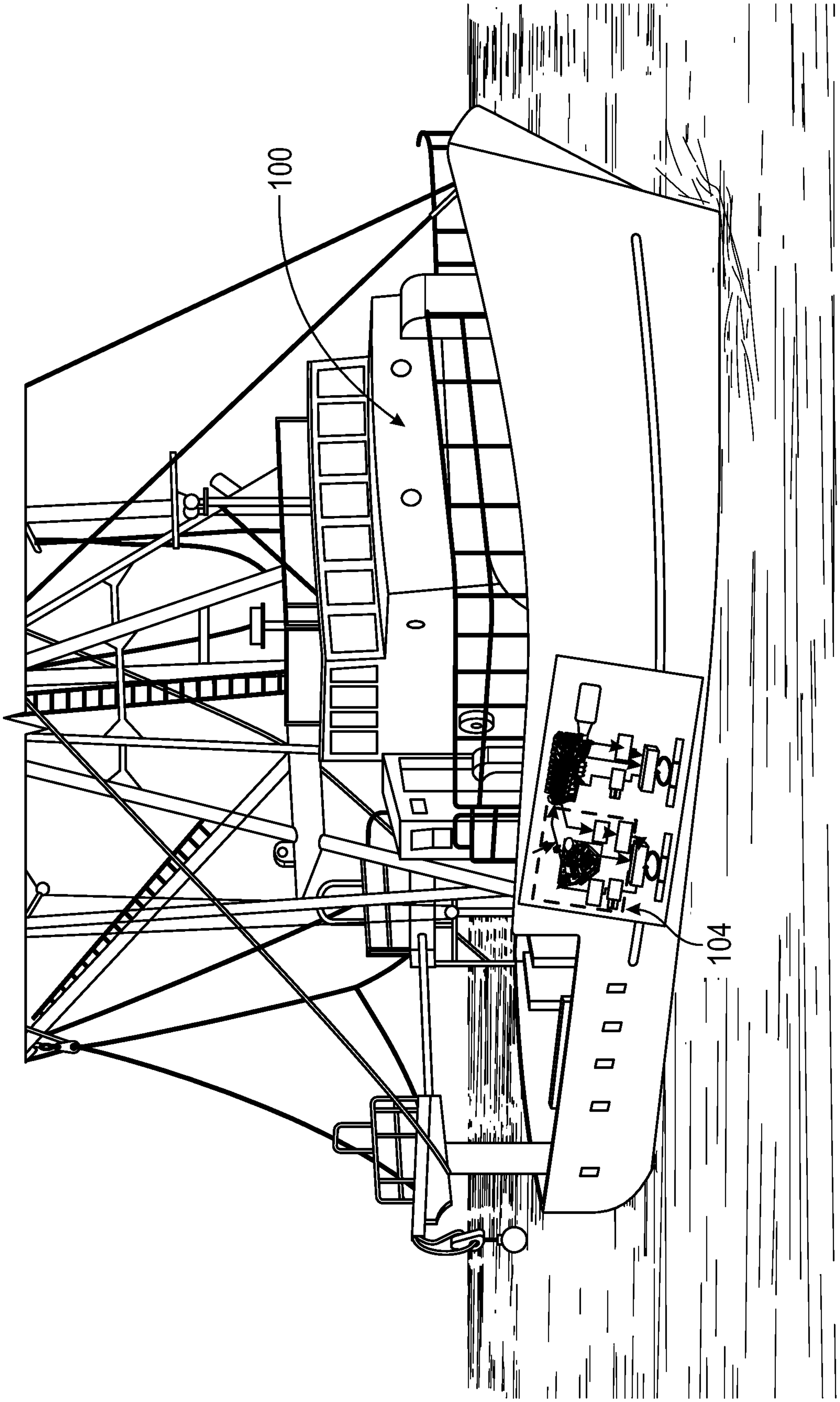
FIG. 1 is a front perspective view of a vessel having a primary power supply system and a containerized alternative fuel control unit, according to one or more examples.

FIG. 1 is a front perspective view of a vessel 100 having a primary power supply system 102 and a containerized alternative fuel control unit 104, according to one or more examples. The vessel 100 may include a work vessel such as a tug boat, salvage boat, fishing boat, cargo ship, or dredging ship or the vessel may be a recreational vessel such as a yacht, ferry boat, or cruise ship, for example. As shown in FIG. 1 and in clearer detail in FIG. 2, the vessel 100 may include a primary power supply system 102 including an internal combustion engine 106, for example. In one or more examples the internal combustion engine 106 may be adapted for use with a primary fuel such as diesel fuel, dimethyl ether (DME), or another primary fuel. The engine 106 may include and/or be in fluid communication with a primary fuel tank 108 that may be equipped with filters, chillers, heaters, and/or other fuel stabilization and/or fuel storage management systems or devices 110. The fuel line 11I extending between the fuel tank 108 and the engine 106 may include filter media 112 including one or more canister-type fuel filters. The system 102 may include a fuel pump return flow line 114 and a return flow line 116 extending from the engine 106 to the primary fuel tank 108. The return flow line 116 may include a plate chiller or other chiller 118 for condensing gaseous fuel prior to returning the gas to the primary fuel tank 108.

As also shown, the engine 106 may include a power take off portion 120 in the form of a drive shaft, fly wheel, or other power take off mechanism. Power from the engine 106 may be delivered at the power take-off 120 and used to run propulsion systems for the vessel 100 and/or to run generators or other systems. The engine 106 and/or power take off systems 120 may include a lubrication system including an oil tank equipped with filters, chillers, heaters, and/or other lubricant stabilization and/or lubricant storage management systems. An oil supply line may include one or more oil filters and/or a pressure-relief valve and a return line may be provided as well.

The vessel 100 may also include a containerized alternative fuel control unit 104 configured to supply the internal combustion engine 106 with an alternative to, for example, the primary diesel or other primary fuel. The containerized alternative fuel control unit 104 may be a compartmentalized or containerized system particularly adapted for maintaining control over the alternative fuel during delivery to the combustion engine 106 from a main alternative fuel supply tank 136A and/or for maintaining control over the alternative fuel during return of the alternative fuel from the combustion engine 106 to the main or a supplementary alternative fuel supply tank 136A/B. That is, for example, in the case of methanol, the explosive and/or flammable nature of the fuel in its liquid and/or gaseous forms may trigger regulations that require higher levels of control to be exercised over the fuel when it is being pressurized for combustion, for example. Still other types of alternative fuels and other types of regulations may implicate a need for a containerized alternative fuel control unit 104 as shown and described herein. As shown, the containerized alternative fuel control unit 104 may include a supporting base 138 and an enclosure 140 including one or more sealed ports or penetrations 142 providing for fluid communication between equipment within the unit 104 and other systems outside the unit 104.

The base 138 may be configured for arrangement on a supporting floor or other structure of a vessel 100 and may be further configured to support fuel management equipment within the containerized alternative fuel control unit 104. It is to be appreciated that while the base 104 may form a floor for supporting equipment, the base 138 might not be part and parcel to a floor of the vessel 100 and may form a separate base structure suitable for aftermarket placement on a floor of the vessel 100 or other supporting frame within the vessel 100. That is, the base 138 may be akin to a skid or other platform providing for transportability of the supported equipment and enclosure relative to the vessel 100. However, since the base 138 may be relatively permanently placed on the vessel 100 and, in some cases, may be constructed within the vessel 100, the base 138 has not been termed a skid.

The base 138 may include one or more frame members forming a framework defining a generally uniform base thickness with a top and bottom. In one or more examples, the framework may include a pair of beams 141 arranged on opposing sides of the framework and a plurality of spaced apart joists 143 extending generally perpendicularly between the pair of beams 141. The joists 143 may frame into the sides of the beams 141 and, as such, be deemed to be arranged in-plane with the beams 141. In one or more examples, the joists 143 and beams 141 may each have a depth and the depth of the joists 143 may be the same as the depth of the beams 141. The base 138 may also include a deck 144 arranged on the top of the framework or on an underside of the framework. In one or more examples, the deck 144 may be a steel, aluminum, wood, or other plate-like decking material including, for example, diamond plating or other slip or skid resistant deck material. In one or more examples, the decking material may be a substantially continuous element without seams or other joints so as to resist and/or prevent leakage of fluids through the base 138. In one or more other examples, any joints or seams may be welded joints or seams or may be sealed joints or seams. For example, sealed joints or seams may be sealed with adhesive or caulk designed to avoid breaking down over time and/or avoid reacting with fluids or chemicals to which it may be exposed within the containerized unit 104. In still other examples, the decking may be coated or lined with a liner such as a membrane liner or other coating to cover any joints or seams and to prevent breakdown and/or reaction with contents of the unit.

The enclosure 140 may be configured for support by the base 138 and may be adapted to contain equipment within the containerized unit 104 in conjunction with the base 138. The enclosure 140 may include one or more panels 146 extending upward from the base 138 and forming a series of walls extending around a peripheral portion or other portion of the base 138. That is, in one or more examples, the panels 146 may be generally aligned with an outer peripheral edge of the base 138 or the panels may be connected inward from the outer peripheral edge causing an exposed portion of the base 138 to form one or more ledges or perches arranged outside of the enclosure 140. The panels 146 may be connected to the base 138 and sealed to the base 138 by bolting, welding, or other coupling technique. In one or more examples, a gasket may be provided between a bottom edge of the panels 146 and the base 138 or welding, sealing, or other techniques may be used to maintain a sealed joint between the panels 146 and the base 138. In one or more examples, the base 138 may include a curb arranged along a peripheral edge or inward from the peripheral edge and extending upward from the base 138. The one or more panels 146 may be secured to a top edge of the curb. The curb may help to avoid leakage of fluids or other materials by maintaining the seam between the base 138 and the panels 146 upward from the deck surface, for example. Still other approaches to sealing the panels 146 relative to the base 138 may be provided. The enclosure panels 146 may also be scaled to one another by bolting, welding, or other coupling technique and a gasket, sealing, or welding may be provided along the joint to reduce and/or prevent leakage of fluids through the joints. It is to be appreciated that a single and/or unitary cylindrical, rectangular, triangular, or other shaped panel 146 may be provided such that the panel portion of the enclosure 140 is a single and/or unitary piece without joints, for example. In one or more examples, the panel 146 may be shaped or molded to fit the confines or geometry of a vessel's hull or other feature to efficiently utilize space on the vessel.

In one or more examples, the panel or panels 146 may include sandwich panels having an inner liner, a filler, and an outer liner or the panels may include a framework similar to the base 138, which may be covered on an inside or outside surface by a finishing material or liner. In one or more examples, the framework may include a filler material and may also include an outer covering. However, in some examples, the framework may more simply be exposed on an outside or inside of the containerized unit.

The enclosure 140 may also include a lid 148. The lid 148 may be configured to close off a top portion of the containerized unit 104 by coupling to and/or sealingly engaging a top edge of the panel or panels 146 discussed above. In one or more examples, the lid 148 may be a sandwich panel or a covered framework as described with respect to the panels 146. The lid 148 may be connected to the panels 146 and sealed to the panels 146 by bolting, welding, or other coupling technique. A gasket may be provided between the lid 148 and the panels or welding, sealing, or other techniques may be used to maintain a sealed joint between the lid 148 and the panels 146. Like the base 138 and the panels 146, the lid 148 may include a continuous inner liner or joints of the liner may be sealed by welding, sealing, or otherwise covering the joints.

It is to be appreciated that while a containerized unit 104 has been described as having separate, but sealingly connected parts including a base 138, panels 146, and a lid 138, some or all portions of the containerized unit 104 may be a unitary structure. For example, an enclosure 140 may be formed by injection molding, fiberglass layup (e.g., carbon fiber or fiberglass), or other techniques creating a unitary structure free from seams or joints between the panels 146 and the lid 148 and/or the entire containerized unit including the base 138, the panels 146, and the lid 148 may be formed as a unitary structure. As such, reference to separate parts of the containerized unit shall not be construed to mean the parts are not unitary.

In one or more examples, an access panel 150 may be provided on the containerized unit 104. The access panel 150 may include a door or panel that is arranged over, across, or within an opening in the containerized unit 104. The door or panel may be removable or openable by a user providing access to the inside volume of the containerized unit 104. A peripheral portion of the door or panel (or alternatively the opening) may include a gasket, seal or other resilient element providing for a sealed condition when the door or panel is closed and/or otherwise placed across the opening in the containerized unit 104. In one or more examples, the door or panel may be a hinged panel, a sliding panel, or a removable panel, for example. The door may also be equipped with safety provisions to prevent access under certain operating conditions (e.g., moving parts or equipment, high electrical energy, etc.) or environmental conditions (e.g., air quality, toxic vapors, temperature, etc.).

Figure 2:
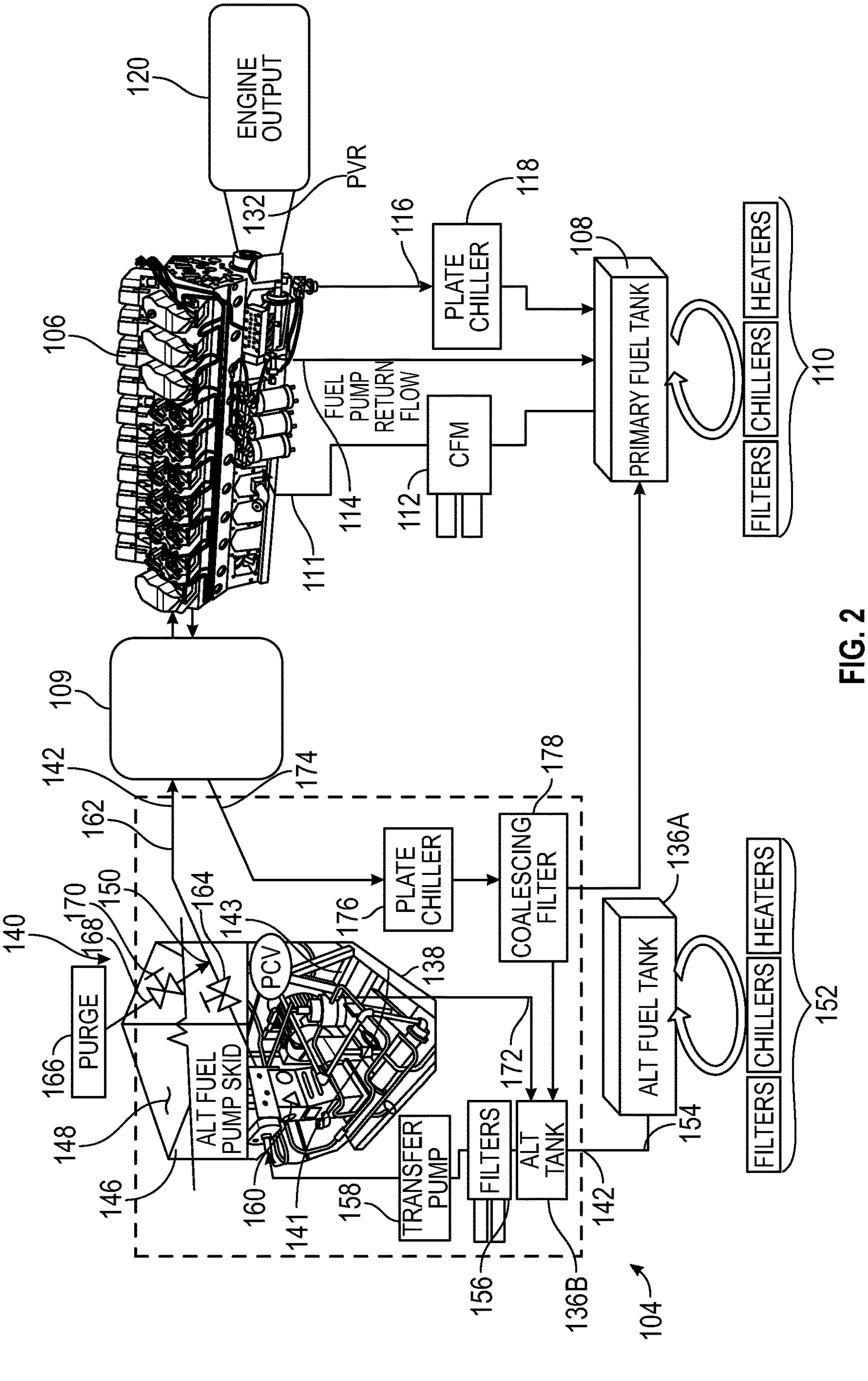
FIG. 2 is an isolated view of the containerized alternative fuel control unit and the combustion engine of the vessel of FIG. 1, according to one or more examples.

With continued reference to FIG. 2, the containerized unit 104 may be configured to contain particularly selected aspects of an alternative fuel supply system, while other aspects of the alternative fuel supply system may be arranged outside of the containerized unit 104. For example, as shown, a main alternative fuel supply tank 136A may be provided and may be arranged outside of the containerized unit 104. Like the primary fuel tank 108, the main alternative fuel tank 136A may include filters, chillers, heaters, and/or other fuel stabilization and/or fuel storage management systems 152. Also, as shown, the combustion engine 106 or other power generating element may also be arranged outside of the containerized unit 104. However, a low-pressure fuel supply line 154 may extend from the main alternative fuel tank 136A, through the enclosure 140 or base 138 of the containerized unit 104 to a supplemental alternative fuel holding tank 136B. The low-pressure fuel line may continue out another portion of the supplemental tank 136B to a fuel filter and/or a fuel filter canister system 156 arranged along the low-pressure fuel supply line 154 and within the containerized unit 104. Still further, a fuel transfer pump 158 for moving the fuel through the low-pressure fuel supply line 154 may be provided. As shown, the transfer pump 158 may be arranged downstream of the filter system 156. Alternatively, the transfer pump 158 may be upstream of the filter system 156 and, for example, at the bottom of the tank 136B so as to push the fuel through the filters and reduce risks associated with vaporizing the fuel. In any case, the transfer pump 158, like the filter system 156, may be arranged within a boundary defined by the containerized unit 104.

As mentioned, the low-pressure fuel supply line 154 may extend between the main alternative fuel supply tank 136A, across the boundary of the containerized unit 104 and to a fuel pressurization system. In one or more examples, the low-pressure fuel supply line 154 may be generally continuous across the containerized unit boundary via a port 142. In one or more examples, the line 154 may penetrate the enclosure or the base and a port in the form of a grommet or other sealing element for protecting the supply line 154 and sealing any gaps between the supply line 154 and an opening in the enclosure 140 or base 138 may be provided. In other examples, the port 142 may be a nipple or other fitting on the containerized unit providing a place for securing the supply line 154 on an outside of the containerized unit 104 and restarting or continuing the supply line 154 on an inside of the containerized unit 104. In some examples, a corresponding nipple or fitting may be provided on an inside of the containerized unit or a more permanent connection between the continuing line on the inside and the external fitting may be provided.

The fuel pressurization system may include a high-pressure pump 160 configured to bring the fuel pressure up to a pressure suitable for use in combustion. The details of the fuel pressurization system are described in more detail below with respect to FIG. 4. However, and generally, a high-pressure fuel line 162 may extend from the fuel pressurization system out of the containerized unit 104 and to the combustion engine 106. In one or more examples, the high-pressure fuel line 162 may be a double-walled line. As with the low-pressure fuel supply line 154, the high-pressure fuel line 162 may be continuous across the boundary of the containerized unit 104 via a port 142 in the form of a grommet or other sealing element. In one or more examples, the port 142 may be in the form of one or more nipples or fittings on an inside of the containerized unit, on an outside of the containerized unit, or both locations. A pressure control valve (PCV) 164 may be arranged on the high-pressure fuel line 162 within the containerized unit. The PCV valve 164 may be adapted to control the pressure in the high-pressure line 162 as it leads to the combustion engine 106.

Figure 3A:
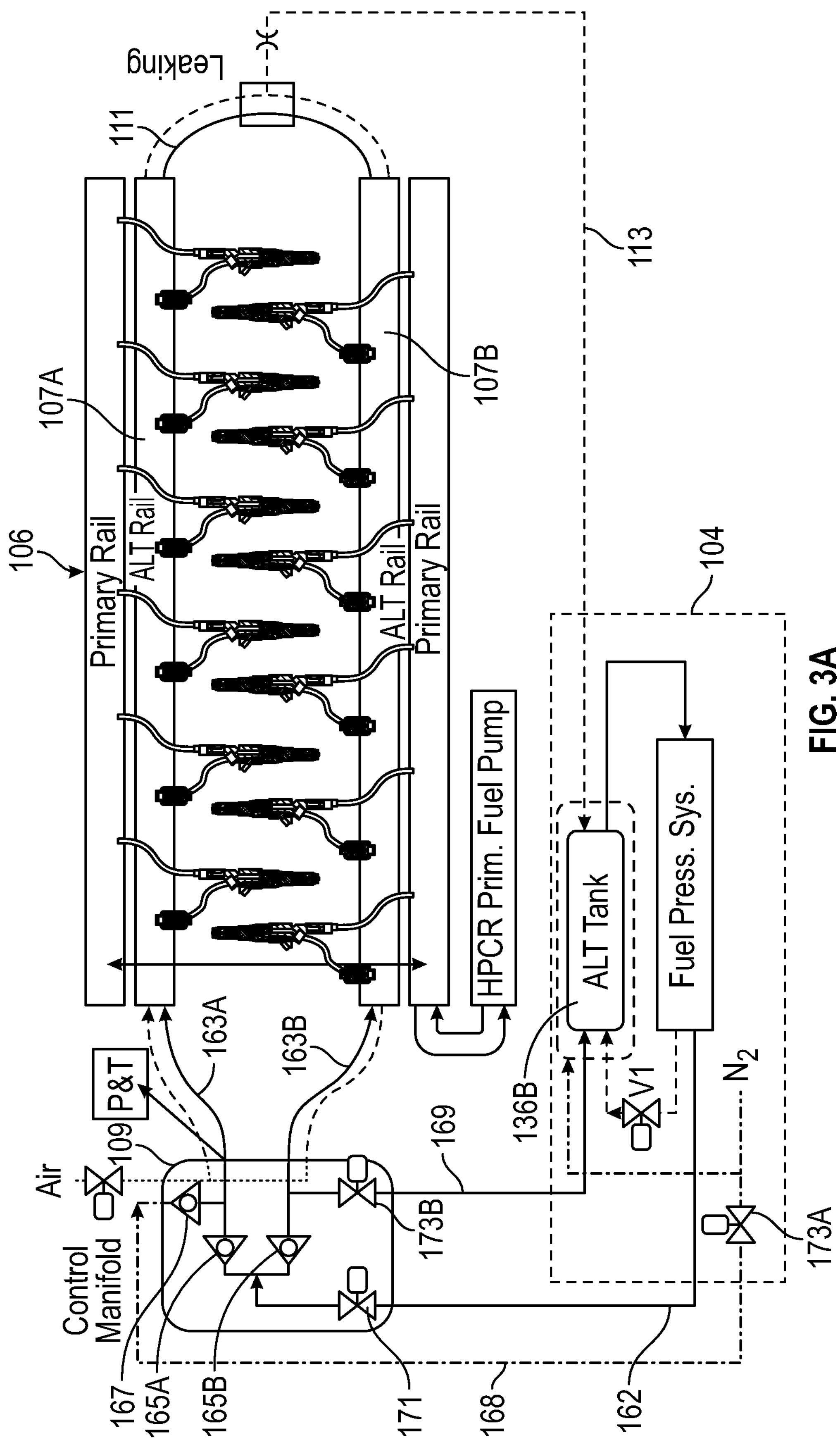
FIG. 3A is a schematic view of an alternative fuel and purge fluid delivery system depicting parallel alternative fuel delivery, according to one or more examples.
Figure 3B:
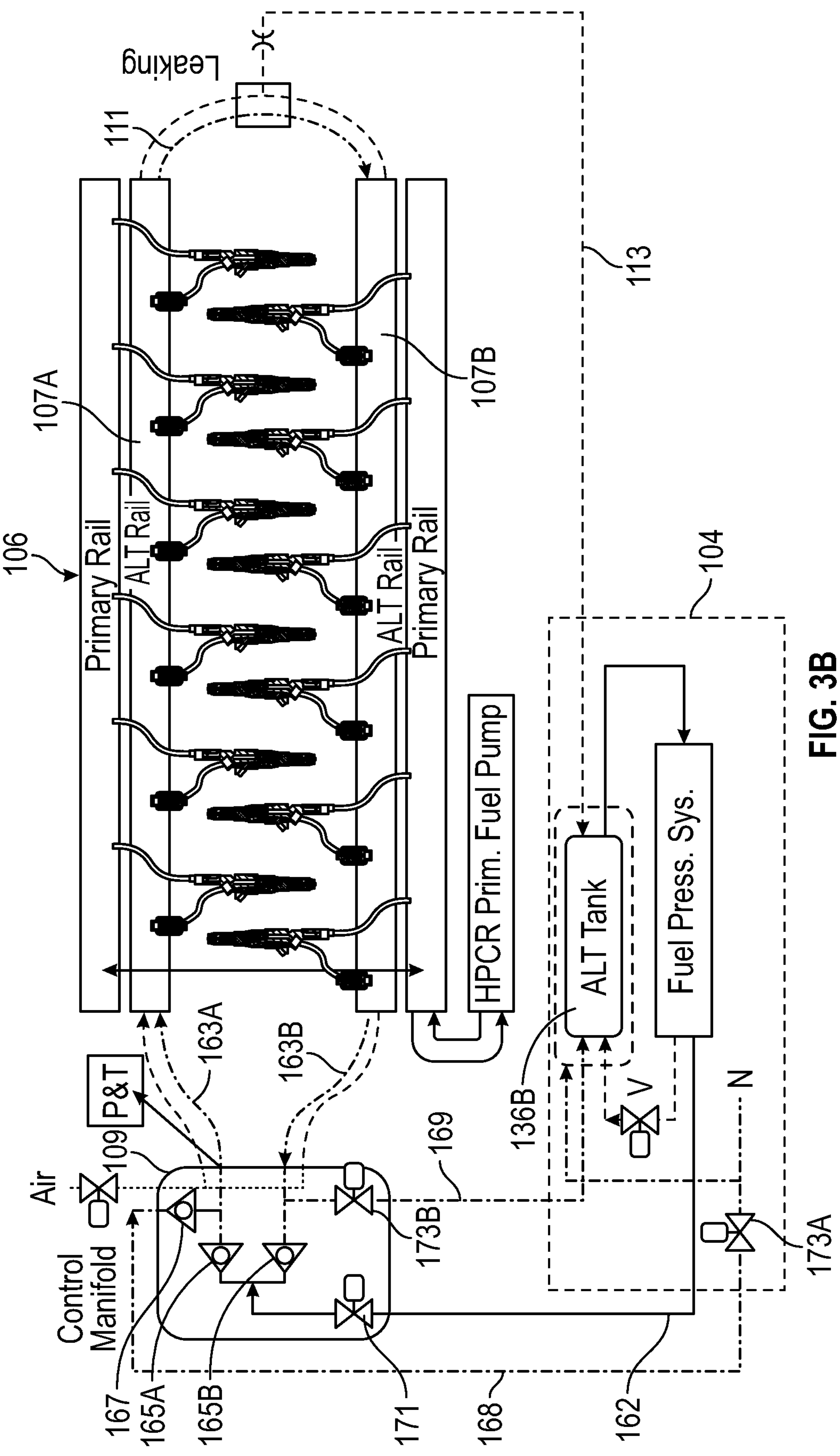
FIG. 3B is a schematic view of an alternative fuel and purge fluid delivery system depicting circuitous purge fluid delivery, according to one or more examples.

As also shown, a purge fluid supply tank 166 may also be provided. The purge fluid supply tank 166 may be arranged outside or inside the containerized unit 104 and may include a purge line 168 extending from the purge fluid supply tank 166 into the containerized unit 104 and to the high-pressure fuel line 162 and/or a to a manifold as shown in FIGS. 3A and 3B. The purge line 168 may be continuous across the containerized unit boundary via a port 142, which may take the form of one or more grommets, sealing elements, nipples, or fittings like the low/high-pressure fuel lines. A purge valve 170 (see also purge valve 173A of FIGS. 3A/3B) may be provided along the length of the purge line 168 and within or outside the containerized unit 104. The purge valve

170 may control the flow of purge fluid and may be opened when purging the high-pressure fuel line 162 and closed when the high-pressure line 162 is being used to deliver alternative fuel to the combustion engine 106.

As shown, an alternative fuel return line 172 may be provided extending from the fuel pressurization system and to the supplemental fuel supply tank 136B. Still further, a return line 174 may also be provided extending from the combustion engine 106 to the supplemental alternative fuel supply tank 136B. The return line 174 may be continuous as it enters and exits the containerized unit via ports 142 such as grommets or sealing elements or ports 142 in the form of nipples or fittings may be provided. The return line 174 may include a plate chiller or condenser 176 and/or a coalescing filter 178 arranged along its length and within the containerized unit 104. In one or more examples, a fuel separator may also be provided and a diverter may direct respective separated fuels to respective fuel tanks. That is, one branch of the return line may extend from the diverter to the supplemental alternative fuel tank 136B while the other branch may extend from the diverter 182 to the primary fuel tank 108. Still other configurations may be provided.

It is to be appreciated that additional equipment may be provided within the container as part of the alternative fuel supply system or separately. For example, service equipment, safety equipment, or other equipment or materials may be arranged within the container. In one or more examples, a fire suppression system may be provided including temperature, vapor, chemical, and/or smoke sensors, and a suppression delivery system may be provided that may be triggered by the one or more sensors. A water, chemical, foam, powder, or other fire suppression material tank, pump, and delivery plumbing may also be provided. In one or more examples, the purge fluid may also be a fire suppression fluid and may be arranged within the containerized unit for supplying fluid to either or both of the purge system and the fire suppression system.

Still further, additional equipment may be provided within the container or outside the container. For example, a low pressure fuel system (LPFS) module, a fuel tank, or an inerting system may be attached to, but outside of, the containerized unit. Connections between the modules may be arranged to line up with one another to allow for configuration changes, for example.

Turning now to FIGS. 3A and 3B, a particular flow diagram is provided that shows an example of the flow of fuel to and from the containerized unit 104 to a combustion engine 106 adapted for selectively operating on primary fuel or alternative fuel. Consistent with FIG. 2, the containerized unit 104 may include a supplementary alternative fuel tank 136B and a fuel pressurization system. The containerized unit 104 may also include a purge fluid supply line 168 extending into the containerized unit 104 from a purge fluid supply tank (not shown) outside the containerized unit 104. Alternatively, the purge fluid supply tank may be located within the containerized unit. The series of flow lines shown may provide for supplying the combustion engine 106 with alternative fuel and may also provide for purging the combustion engine 106 of alternative fuel when switching back to use of primary fuel, for example.

For purposes of discussing supplying the combustion engine 106 with alternative fuel, reference is made to FIG. 3A. As shown, the fuel pressurization system may be in fluid communication with one or more alternative fuel supply rails 107A and 107B within the combustion engine via the supply line 162 shown in FIG. 2 and a control manifold 109. The control manifold 109 may split the incoming alternative fluid supply line 162 into two delivery lines 163A/163B and may be configured to deliver alternative fuel to each of the two alternative fuel supply rails 107A/107B within the combustion engine 106. The two delivery lines 163A/163B may each include a check valve 165A/165B that inhibits or prevents flow back toward the containerized unit 104, but allows flow to the combustion engine 106. The two alternative fuel supply rails 107A/107B within the combustion engine 106 may be connected at their trailing ends (e.g., opposite the incoming flow from the control manifold) by a connecting line 111. A leakage flow line 113 may be coupled to the connecting line 111 and may extend back to the supplementary alternative fuel tank 136B within the containerized unit 104. Based on the above, the fuel pressurization system may draw fuel from the supplementary alternative fuel supply tank 136B and pump the fluid through the supply line 162 to the control manifold 109 and to each of the alternative fuel supply rails 107A/107B, where the combustion engine may burn the alternative fuel for operation. During this operation leakage flow may be captured and returned to the supplementary fuel supply tank 136B.

For purposes of discussing purging the system of alternative fuel, reference is made to FIG. 3B, which has the same components as FIG. 3A, but shows a different flow path through the components. For example, in FIG. 3B, the purge fluid supply may be in fluid communication with the one or more alternative fuel supply rails 107A/107B within the combustion engine 106 via a purge fluid supply line 168 and the control manifold 109. The purge fluid supply line 168, rather than being split upon entering the manifold 109 like the fuel supply line 162, may be in fluid communication with only one of the two delivery lines 163A, but not the other delivery line 163B within the manifold 109. A check valve 167 may be provided to allow purge fluid to be delivered to the delivery line 163A and the associated alternative fuel supply rail 107A, but return to the purge fluid supply tank may be inhibited or prevented. When purging the system, the purge fluid may flow into one of the alternative fuel supply rails 107A, out the trailing end and into the other alternative fuel supply rail 107B via the connecting line 111. The purge fluid may flow through the other rail 107B and back to the control manifold 109 via the other of the two alternative fuel delivery lines 163B, which may be in fluid communication with a purge fluid return line 169. The purge fluid return line 169 may be in fluid communication with the supplementary alternative fuel supply tank 136B, thereby driving any alternative fuel back to the supplementary alternative fuel supply tank 136B. A series of controllable valves may be provided to control the direction of flow during alternative fuel supply as compared to purging. For example, a fuel supply valve 171 may be open when delivering alternative fuel, but closed when purging. Similarly, purge valves 173A and 173B may be closed during alternative fuel supply, but open during purging.

Figure 4:
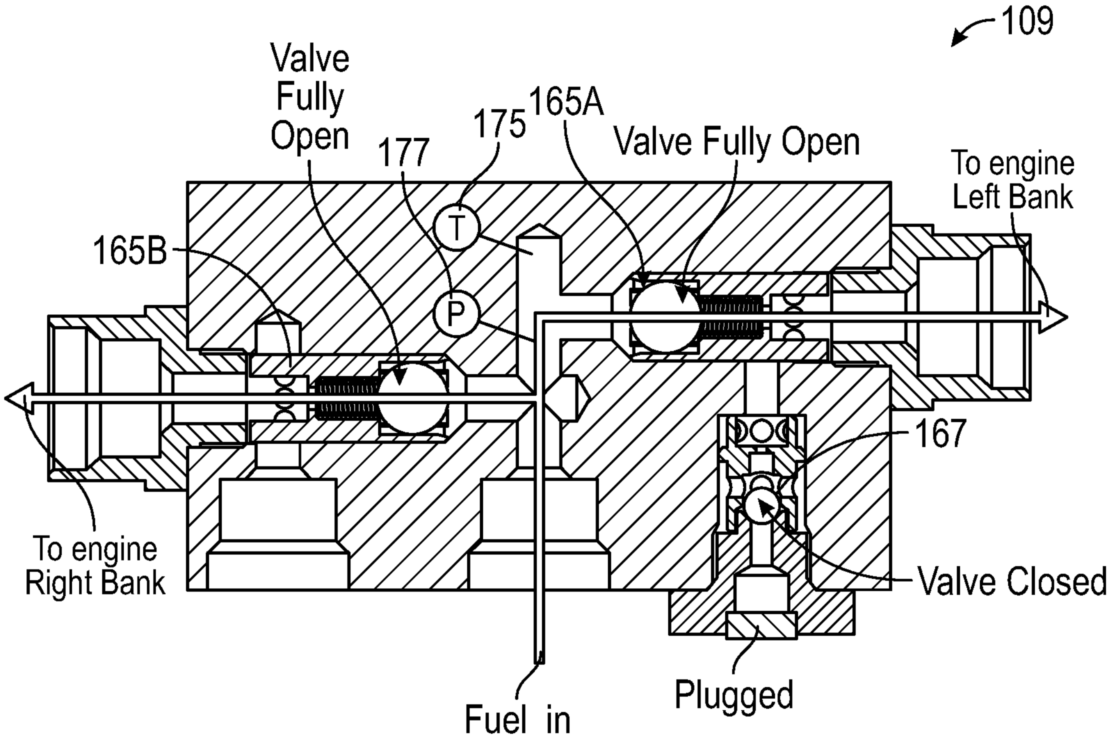
FIG. 4 is a cross-sectional view of a manifold of the system of FIGS. 3A and 3B.

FIG. 4 shows an example cross-section of the control manifold 109 in an alternative fuel supplying condition. That is, alternative fuel is being pumped into the manifold 109 at the "fuel in" location and check valves 165A/B, while biased closed, are open due to the fuel pressure and fuel flow allowing the fuel to flow out both sides of the manifold to respective alternative fuel rails. When alternative fuel flow stops, the check valves 165A/B may close by shifting toward the central inlet bore under the force of their respective biasing springs and seating in a conical seat, for example. When purge operations are initiated, the check valves

165A/B may remain closed, but check valve 167 may open under the pressure and flow of the purge fluid such that purge fluid may flow into the manifold 109 and since the respective check valve 165A in the delivery line 163A is closed, the purge fluid may flow to the respective alternative fuel rail 107A, through the connecting line 111, to the other alternative fuel rail 107B and back to the manifold 109 where it may be directed to the supplementary alternative fuel tank in the containerized unit 104. As shown, temperature and pressure sensors 175/177 may be provided within the manifold 109 to manage the processes.

Figure 5:
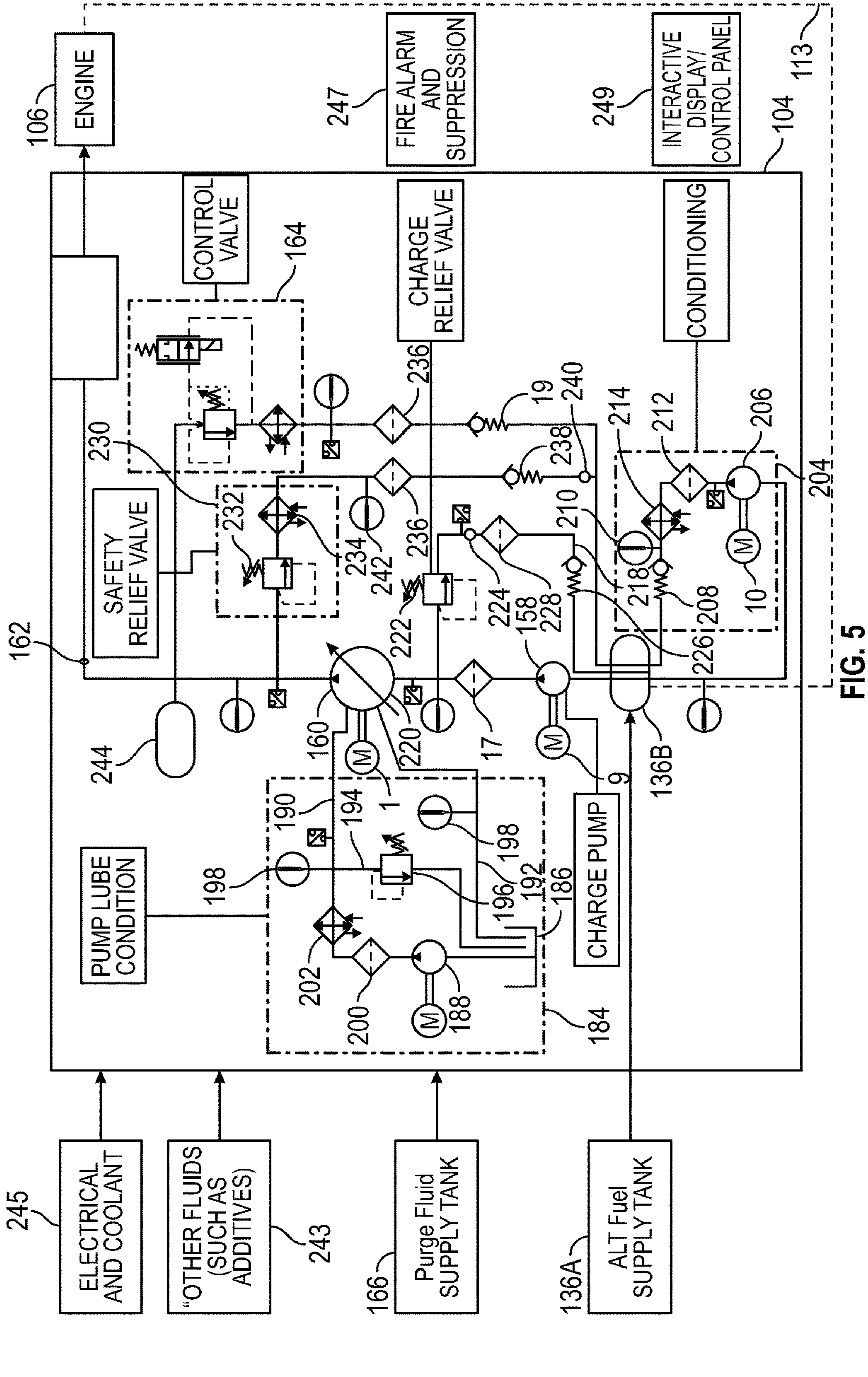
FIG. 5 is a schematic diagram of the containerized alternative fuel control unit of FIG. 2, according to one or more examples.
Figure 6:
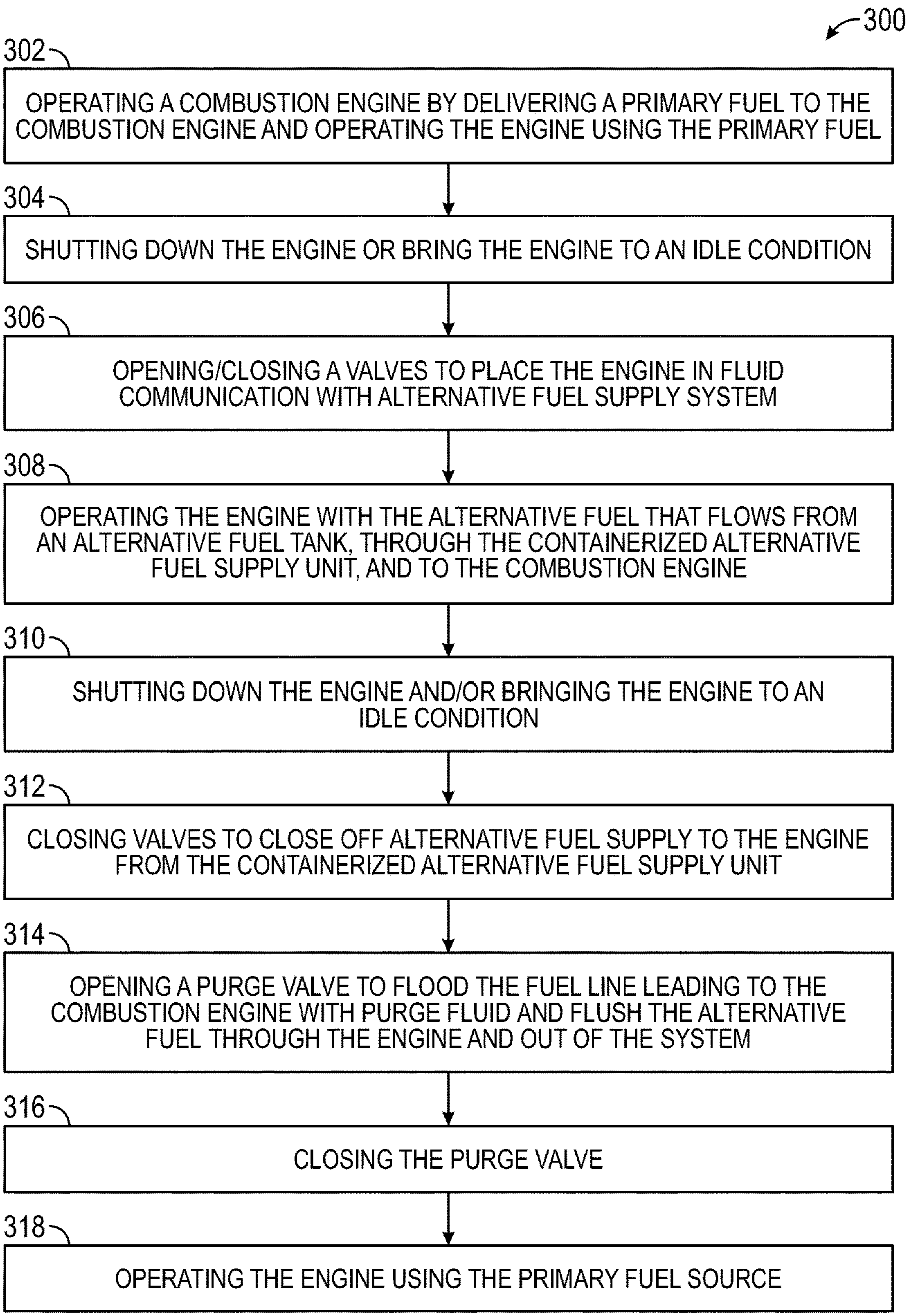
FIG. 6 is a method diagram depicting a method of operating an engine having a containerized alternative fuel control unit, according to one or more examples.

Turning now to FIG. 5, a schematic diagram of the above-described system is shown. The containerized unit 104 is shown as a boundary line extending around selected aspects of the alternative fuel delivery system. Several aspects of FIG. 5 correspond to aspects shown and described with respect to FIG. 2. For example, the schematic diagram includes a charge or transfer pump 158 and a high-pressure pump 160. FIG. 5 also shows, in more detail, several other aspects of the alternative fuel delivery system. For example, the alternative fuel delivery system may include a lubrication circuit 184 for the high-pressure pump system and arranged within the containerized unit 104. As shown, the lubrication circuit 184 may include a lubrication tank 186, a lubrication pump 188 in fluid communication with the tank 186 and lubrication supply 190 and return 192 lines extending to/from the tank to/from the high-pressure pump 160. The lubrication pump 188 may be arranged along the supply line 190 to deliver lubrication to the high-pressure pump 160. The circuit may also include a bypass line 194 with a bypass valve 196 and may also include one or more temperature gauges 198 for monitoring the temperature of the lubrication fluid. As shown, the lubrication circuit 184 may also include an oil filter 200 and an oil cooler 202.

In addition to a lubrication circuit 184, the containerized unit 104 may also include an alternative fuel conditioning circuit 204. That is, as shown, the alternative fuel conditioning circuit 204 may include a pump 206, a check valve 208, a temperature gauge 210, a fuel filter 212, and a fuel cooler 214. A sealed and pressurized reservoir or a tank 136B may also be provided for supplying stable alternative fuel to the high-pressure pump 160. That is, where the tank 136B is pressurized, the pressurized reservoir may resist vaporization of the alternative fuel where the temperature of the fuel exceeds the liquid/gas curve at a particular temperature and pressure. The conditioning circuit pump 206 may be arranged to receive alternative fuel from the sealed and pressurized reservoir or tank 136B and pump the fluid back to the reservoir or tank 136B via a check valve 208. The fuel filter 212 and cooler 214 may be arranged downstream of the pump 206 between the pump 206 and the check valve 208. The temperature gauge 210 may be arranged between the pump 206 and the check valve 208 as well.

A charge pump relief circuit 218 may also be provided that includes a fuel temperature gauge 220, a relief valve 222, and a return line 224 extending back to the alternative fuel conditioning circuit 204. That is, when, for example, pressure between the charge pump 158 and the high-pressure pump 160 exceeds a setting of the relief valve 222, the charge pump relief circuit 218 may direct fuel back to the sealed and pressurized reservoir or tank 136B via a check valve 226. Alternatively, while not shown, the charge pump relief circuit 218 may direct fuel back to the supplemental alternative fuel tank 136B. The charge pump relief circuit 218 may also include fuel filter 228 arranged between the relief valve 222 and the check valve 226.

The containerized unit 104 may also include a safety circuit 230 in communication with the high-pressure fuel line 162 and extending back to the alternative fuel conditioning circuit 204. The safety circuit 230 may include a safety relief valve 232, a fuel cooler 234, a fuel filter 236, a check valve 238, and a return line 240 extending back to the alternative fuel conditioning circuit 204. That is, when, for example, pressure downstream of the high-pressure pump 160 exceeds a setting of the safety relief valve 232, the safety relief circuit 230 may direct fuel back to the sealed and pressurized reservoir or tank 136B via a check valve 238. Alternatively, the safety relief circuit 230 may direct fuel back to the supplemental alternative fuel supply tank 136B. As shown, the fuel cooler 234 and the fuel filter 236 may be arranged along the return line 240 between the safety relief valve 232 and the check valve 238. The temperature gauge 242 may also be arranged along this portion of the return line 240.

The containerized unit 104 may also include a high-pressure accumulator 244 and a pressure control valve 164. The high-pressure accumulator may help to stabilize pressure fluctuations downstream of the high-pressure pump 160. For example, the accumulator may function to dampen pressure waves when fuel demand suddenly changes from high to low or may act as a fuel supply source (supplementing the pump) if demand changes from low to high. The pressure control valve (PCV) 164 may maintain the pressure of the alternative fuel during operation. If the pressure of the system needs to change, or there is a large change in fuel demand, the PCV may act as a relief valve to either dump excess flow to limit pressure, or close to allow pressure to increase. For example, the alternative fuel pump may not respond quickly enough to demand changes that may cause an increase or decrease in desired pressure and the high-pressure accumulator 244 and the PCV 164 may assist with this. As shown, the control valve may include a return line extending back to the conditioning circuit. Alternatively, the return line may extend to the supplemental alternative fuel tank 136B.

As discussed with respect to FIGS. 3A and 3B, the containerized unit 104 may include a supplementary alternative fuel supply tank 136B within the containerized unit 104. As shown here, in FIG. 5, and consistent with FIGS. 3A and 3B, an alternative fuel leakage return line 113 may be provided from the engine 106 outside the containerize unit 104 to the supplementary alternative fuel supply tank 136B within the containerized unit 104. As discussed with respect to FIG. 2, the purge fluid supply tank 166 and the main alternative fuel supply tank 136A may be arranged outside of the containerized unit 104. Additional fluid tanks 243 may also be provided outside the containerized unit 104, as shown, such as for providing additives or other fluids to the alternative fuel supply system. Electrical and coolant systems 245 may also be provided outside of the containerized unit. In addition, the combustion engine 106 may also be provided outside of the containerized unit 104. Fire alarm and suppression systems 247 may be provided that may monitor the containerized unit 104 and function to both alarm and suppress fire, should a fire occur. An interactive display and control panel 249 may also be provided for controlling the several components within the containerized unit. While show outside the containerized unit, these systems or portions thereof may be arranged within the containerized unit.

It is to be appreciated that one example alternative fuel may include methanol. However, still other alternative fuel systems may be provided such as ethanol, naphtha gas, natural gas, gasoline, etc. and the present disclosure should not be limited to the specifics of the alternative fuel system shown and described. Rather, the present disclosure should be understood to include an arrangement of a main alternative fuel tank and a purge fluid tank as well as a combustion engine outside of a containerized unit, but in fluid communication with fuel processing systems inside the containerized unit, regardless of the type of fuel being used. Still further, while the containerized alternative fuel control unit has been described as being part of a vessel, the unit may also be part of a land-based machine or work machine, for example. Still other applications of the containerized alternative fuel control unit may be provided. Moreover, while the primary fuel system has been described generally as diesel, a dimethyl ether or different primary fuel system may be provided. Still further, an additional or third system (diesel, DME, methanol) where DME is used in place of diesel to get to true carbon neutral. In this system, the DME system may be inside the container, or it may be in its own separate container, or it may run in place of diesel as mentioned.

INDUSTRIAL APPLICABILITY

It is to be appreciated that by establishing a containerized unit that contains the fuel conditioning and management aspects of an alternative fuel system, owners and operators may avoid the need for dedicated pump rooms on their vessels thereby saving space and significantly reducing retrofit costs. Rather, the presently described alternative fuel containerized unit may provide for simple retrofits and/or manufacture of new vessels simply by placing the fully contained and ready for use system within the vessel and placing the contained unit in fluid communication with an alternative fuel tank, a purge fluid tank, and the combustion engine. Moreover, regulatory issues associated with fuel management may be addressed by the construction details of the containerized alternative fuel supply unit, thus, removing these issues from the retrofit or manufacturing issues associated with the vessel.

In operation and use, a method 300 of supplying fuel to a combustion engine may be provided. For example, the method may include operating a combustion engine by delivering a primary fuel to the combustion engine and operating the engine using the primary fuel 302. The method may also include shutting down the engine or bring the engine to an idle condition 304. The method may also include opening/closing one or more valves to place the engine in fluid communication with alternative fuel supply system 306. The method may include operating the engine with the alternative fuel that flows from an alternative fuel tank, through the containerized alternative fuel supply unit, and to the combustion engine 308. The method may also include shutting down the engine and/or bringing the engine to an idle condition 310. The method may also include closing valves to close off alternative fuel supply to the engine from the containerized alternative fuel supply unit 312. The method may also include opening a purge valve to flood the fuel line leading to the combustion engine with purge fluid and flush the alternative fuel through the engine and out of the system 314. The method may also include closing the purge valve 316 and operating the engine using the primary fuel source 318.

The above detailed description is intended to be illustrative, and not restrictive. The scope of the disclosure should, therefore, be determined with references to the appended claims, along with the full scope of equivalents to which such claims are entitled.

What is claimed is:

1. An alternative fuel management (AFM) system, comprising:
- a base configured for arrangement on a supporting floor or other framework of a vessel and configured to support alternative fuel supply equipment;
- a sealed enclosure sealingly coupled to the base and configured to surround the alternative fuel supply equipment;
- the alternative fuel supply equipment arranged within the sealed enclosure, and comprising:
  - a high-pressure pump configured to be placed in fluid communication with a main alternative fuel tank arranged outside the sealed enclosure via a fuel supply line that extends across the sealed enclosure;
  - a fuel filter arranged along the fuel supply line and between the main alternative fuel tank and the high-pressure pump;
  - a transfer pump configured to deliver alternative fuel to the high-pressure pump; and
  - a high-pressure fuel delivery line extending across the sealed enclosure and configured to provide the alternative fuel from the high-pressure pump to a combustion engine;
- a purge fluid system configured to deliver purge fluid to the combustion engine from a source of the purge fluid; and
- a fuel return line comprising a first branch extending to a supplemental alternative fuel tank and a second branch extending to a primary fuel tank.

2. The AFM system of claim 1, wherein the fuel return line comprises a fuel separation system arranged thereon and within the sealed enclosure.

3. The AFM system of claim 2, wherein the fuel return line comprises a diverter arranged thereon and within the sealed enclosure.

4. The system AFM system of claim 3, wherein the diverter is configured for diverting the alternative fuel to the supplemental alternative fuel tank and diverting primary fuel to the primary fuel tank.

5. The system AFM system of claim 1, further comprising a pressure control valve arranged on the high-pressure fuel delivery line and within the sealed enclosure and configured to control delivery of the alternative fuel to the combustion engine from the high-pressure pump.

6. The system AFM system of claim 5, further comprising a purge valve arranged on a purge line and within the sealed enclosure and configured to control the delivery of the purge fluid to the combustion engine from the source of the purge fluid.

7. The system AFM system of claim 1, further comprising a manifold configured to deliver the alternative fuel to rails within the combustion engine in parallel.

8. The system AFM system of claim 7, wherein the manifold is configured for purging the combustion engine of the alternative fuel in a circuitous manner.

9. A motive system for a vessel, comprising:
- a combustion engine;
- a primary fuel source, comprising:
  - a primary fuel supply tank;
  - a primary fuel supply line extending from the primary fuel supply tank to the combustion engine; and
  - a primary fuel filter arranged on the primary fuel supply line;

an alternative fuel source, comprising:

a main alternative fuel tank; and a source of purge fluid; and an alternative fuel management system, comprising:

a base configured for arrangement on a supporting floor or other framework of the vessel and configured to support alternative fuel supply equipment;

a sealed enclosure sealingly coupled to the base and configured to surround the alternative fuel supply equipment; and the alternative fuel supply equipment arranged within the sealed enclosure, and comprising:

a high-pressure pump configured to be placed in fluid communication with the main alternative fuel tank arranged outside the sealed enclosure via a fuel supply line that extends across the sealed enclosure;

a fuel filter arranged along the fuel supply line and between the main alternative fuel tank and the high-pressure pump;

a transfer pump configured to deliver alternative fuel to the high-pressure pump; and a high-pressure fuel delivery line extending across the sealed enclosure and configured to provide the alternative fuel from the high-pressure pump to the combustion engine; and a purge fluid system configured to deliver purge fluid to the combustion engine from the source of the purge fluid.

10. The motive system of claim 9, further comprising a fuel return line configured to extend from the combustion engine across the sealed enclosure to a supplemental alternative fuel tank.

11. The motive system of claim 10, wherein the fuel return line comprises a fuel separation system arranged thereon and within the sealed enclosure.

12. The motive system of claim 11, wherein the fuel return line comprises a diverter arranged thereon and within the sealed enclosure.

13. The motive system of claim 12, wherein the diverter is configured for diverting the alternative fuel to the supplemental alternative fuel tank and diverting primary fuel to the primary fuel supply tank.

14. The motive system of claim 9, further comprising a pressure control valve arranged on the high-pressure fuel delivery line and within the sealed enclosure and configured to control delivery of the alternative fuel to the combustion engine from the high-pressure pump.

15. The motive system of claim 14, further comprising a purge valve arranged on the purge line and within the sealed enclosure and configured to control the delivery of the purge fluid to the combustion engine from the source of the purge fluid.

16. The motive system of claim 9, further comprising a manifold configured to deliver the alternative fuel to rails within the combustion engine in parallel.

17. The motive system of claim 16, wherein the manifold is configured for purging the combustion engine of the alternative fuel in a circuitous manner.

18. A waterborne vessel, comprising:

a hull;

a floor arranged on the hull;

a propulsion system comprising a combustion engine system comprising a combustion engine and a primary fuel tank; and an alternative fuel management system, comprising:

a base configured for arrangement on the floor or other framework of the waterborne vessel and configured to support alternative fuel supply equipment;

a sealed enclosure sealingly coupled to the base and configured to surround the alternative fuel supply equipment;

the alternative fuel supply equipment arranged within the sealed enclosure, and comprising:

a high-pressure pump configured to be placed in fluid communication with a main alternative fuel tank arranged outside the sealed enclosure via a fuel supply line that extends across the sealed enclosure;

a fuel filter arranged along the fuel supply line and between the main alternative fuel tank and the high-pressure pump;

a transfer pump configured to deliver alternative fuel to the high-pressure pump; and a high-pressure fuel delivery line extending across the sealed enclosure and configured to provide the alternative fuel from the high-pressure pump to the combustion engine; and a purge fluid system configured to deliver purge fluid to the combustion engine from a source of purge fluid.

19. The waterborne vessel of claim 18, further comprising a pressure control valve arranged on the high-pressure fuel delivery line and within the sealed enclosure and configured to control delivery of the alternative fuel to the combustion engine from the high-pressure pump.

* * * * *